United States Patent Office 3,506,622
Patented Apr. 14, 1970

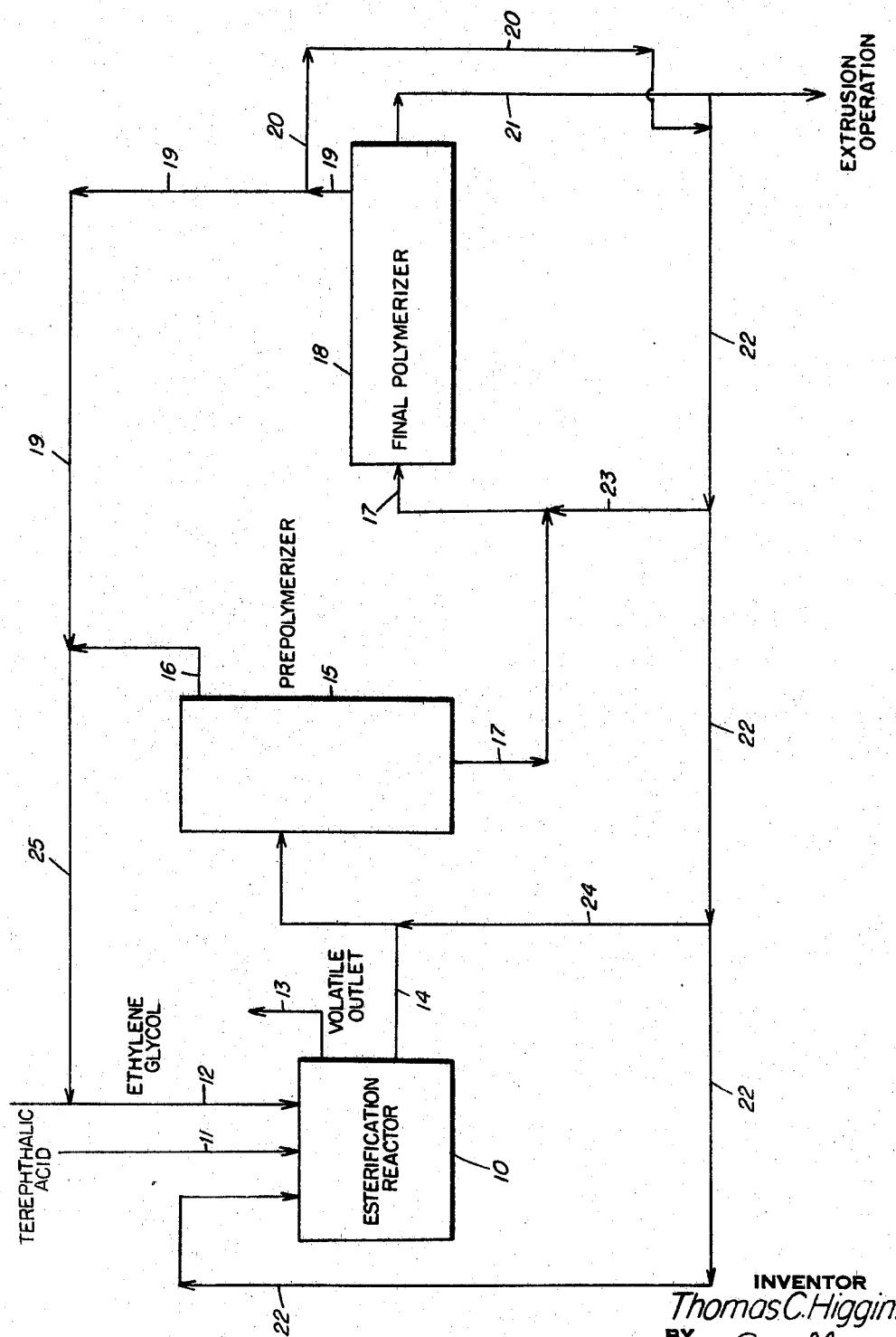

3,506,622
CONTINUOUS POLYETHYLENE TEREPHTHALATE PROCESS
Thomas C. Higgins, Shelby, N.C., assignor to Fiber Industries, Inc., a corporation of Delaware
Continuation of application Ser. No. 371,260, June 1, 1964. This application Dec. 13, 1968, Ser. No. 785,059
Int. Cl. C08g 17/01
U.S. Cl. 260—75                                    6 Claims

ABSTRACT OF THE DISCLOSURE

In a continuous process for the production of polyethylene terphthalate constant equilibrium conditions are maintained in the polymerization stages. Prior to the extrusion stage, excess polymer is removed and treated with ethylene glycol to produce the polymer precursor which is then added to the polymerization reaction at the point of corresponding intrinsic viscosity. The process obviates the necessity for the addition of solid scrap polymer in the final polymerization.

---

This is a continuation of application Ser. No. 371,260, filed June 1, 1964, and now abandoned.

This invention relates to polymerization processes and, more particularly, to improvements in the continuous production of polymethylene terephthalate polymers.

In the commercial production of polymethylene terephthalate polymers, it is highly desirable and feasible to produce large amounts of polymer using a continuous polymerization process. Various methods for the production of polymethylene terephthalate polymers on a continuous basis are known in the art, but these known processes have various disadvantages which can present extensive control problems and provide an undesirable non-uniform quality product. Attempts have been made to maintain a uniform polymer quality in continuous polymerization processes by controlling the level of the molten polymer in the final polymerization reactor by the continuous addition of solid scrap polymer to the monomeric material. The amount being added being of necessity equal to the increased or decreased demand of the extrusion equipment from the polymer exit. Although it is possible to maintain a satisfactory control of the polymer quality utilizing the addition of solid scrap polymer, obvious disadvantages are present. Of the significant disadvantages of the known continuous polymerization processes, the quality of the scrap polymer to be added must be carefully selected to avoid the addition of undesirable foreign contaminants; the handling problems of the solid scrap polymer are significantly increased and a separate reaction stage is required to convert the solid highly polymeric waste into a liquid low polymer suitable for feeding into the system. The major disadvantage, however, is in the fact that as the rate of demand for high polymer increases or decreases at the extrusion apparatus; the maintenance of a constant level in the reactor obviously gives rise to variations in residence time which can appreciably affect the degree of polymerization and polymer quality. Further, detection of level changes in the highly viscous polymer in the reactor is difficult instrumentally and the lag or delay between the detection of level changes and adjustment of the quantity of solid scrap being fed upsets the equilibrium conditions in the reactor.

It is the over-all object of this invention to provide improvements in the continuous polymerization processes for the production of polymethylene terephthalate polymers wherein variations in supply of polymer to the extruder as required can readily be made while maintaining a uniform quality of polymer throughout the entire reaction process. It is a further object of the invention to provide an economic and convenient method for controlling the liquid polymer level throughout the reactor stages to provide a uniform quality polymer with a minimum amount of effort in the continuous production of polymethylene terephthalate polymers. These and other objects will become more apparent by the subsequent disclosure and appended claims.

The objects of this invention can be readily obtained in a continuous polymerization process for the production of polymethylene terephthalate polymer which polymerizes bis(hydroxyalkyl) terephthalate by polymerizing at a rate in excess of the maximum requirements and taking off as a side stream the excess polymer produced prior to the extrusion operation in molten state and adding sufficient amounts of the corresponding alkylene glycol containing 2 to 10 carbon atoms used to prepare said bis(hydroxyalkyl) terephthalate to said excess molten polymer to produce the precursor of said polymer. The precursor of the polymer having an intrinsic viscosity lower than the final polymer can then be returned to the continuous polymerization reaction at the point wherein the intrinsic viscosity of the precursor corresponds essentially to the intrinisic viscosity of the material fed to the high polymer reactor, thus maintaining a constant level of the polymerization mass and at the same time constant throughout and residence time in the reactor. This method provides a unique manner of maintaining invariant conditions within the reactor irrespective of changes in demand for extrusion purposes, eliminates the need for level detection and the considerable upset in equilibrium associated with such methods of control. By virtue of this invention, therefore, the level and throughput of material in the reactor and hence the residence time are held constant irrespective of extrusion requirements with obvious advantages.

For purposes of clarification, it is considered essential to define various terms used herein for purposes of simplifying the understanding of the subject matter. The term "precursor" as used herein and in the appended claims is defined as the product obtained by the reaction of the alkylene glycol with the excess polymethylene terephthalate polymer produced. For example, when ethylene glycol is reacted with a high molecular weight polyethylene terephthalate polymer under specific reaction conditions, monomeric bis(2-hydroxyethyl) terephthalate can be obtained. Under other reaction conditions, a prepolymer of the polyethylene terephthalate polymer, i.e. having a lower intrinsic viscosity than the finished polymer, can also be obtained. Further, a mixture of monomeric bis(2-hydroxyethyl) terephthalate and prepolymer can also be obtained. Regardless of the composition of the precursor, the precursor product will contain an intrinsic viscosity lower than the final intrinsic viscosity of the polymethylene terephthalate polymer produced for extrusion. The term "extrusion" as used herein defines the operation used to form or spin uniform filaments or to cast filaments or films of uniform sizes. Other terms which are utilized are considered to be understandable terms of the art or are defined in other specific portions of this specification.

The monomeric bis(hydroxyalkyl) terephthalate product can be prepared for use in the process of this invention by at least two different methods. One can be utilized for the direct esterification of terephthalic acid and an alkylene glycol described in more detail below under similar conditions as described in U.S. Patent 3,050,533. In another method, the dialkyl ester of terephthalic acid in which the alkyl radicals can contain from 1 to 10 carbon atoms can generally be reacted with about 2 molar portions of an alkylene glycol having the formula $HO(CH_2)_nOH$, wherein $n$ is an integer in the range from 2 to 10 inclusive. It is preferred, however, to use higher portions of the glycol, in excess of 2 molecular portions of the glycol per molecular portion of the terephthalate derivative, since by using such portions, the initial transesterification reaction is caused to take place more rapidly and completely. The reaction conditions for the transesterification reaction are conducted at elevated temperatures and atmospheric, subatmospheric and superatmospheric pressure. Normally, the desired temperatures of the reaction can range from about the boiling temperatures of the reaction mixture to as high as 250° C., if desired. During the course of this transesterification reaction utilizing a dialkyl ester of terephthalate as the starting material, the glycol reacts with the stating material to form bis(hydroxyalkyl) terephthalate and an alkanol by-product. As an illustration, the reaction of dimethyl terephthalate with ethylene glycol will produce bis(2-hydroxyethyl) terephthalate and methanol as a by-product. It is highly desirable to remove the methanol content as it is formed in the reaction to assure a faster reaction and at the same time remove the unused ethylene glycol which is distilled from the esterification product.

Although the bis(hydroxyalkyl) terephthlate monomer can be produced without the use of a catalyst, it is highly desirable to utilize a catalyst to speed up the reaction. Many catalysts are known for use in the initial transesterification reaction including, among others; the alkali metals, alkaline earth metals, antimony, antimonic acid, beryllium boron cadium, cerium, chromium, cobalt, lanthanum, magnesium, manganese, titanium, zinc and the like, the corresponding compounds of the above-described metals such as the oxides, carbonates, acyl derivatives, phosphorus derivatives, and the like, and combinations of the above-described catalysts. It is highly desirable to utilize a catalyst which will not only speed up the reaction but will not adversely affect the physical properties of the resulting product.

The alkylene glycols which can be used to produce the monomeric bis(hydroxyalkyl) terephthalates in the process of this invention relate to the series

$$HO(CH_2)_nOH$$

where $n$ is an integer from 2 to 10. The glycols included in the series are ethylene glycol, trimethylene glycol, tetramethylene glycol, pentamethylene glycol, hexamethylene glycol, heptamethylene glycol, and the like. It is advantageous to utilize the glycols having from 2 to 4 methylene groups since these give highly polymerized esters with high melting points and, of these glycols, ethylene glycol is highly preferred. In general, highly purified alkylene glycols are preferable in the production of the monomer; however, it has been discovered that the alkylene glycol recovered in the polymerization of bis(hydroxyalkyl) terephthalate can be reused without additional purification in the production of bis(hydroxyalkyl) terephthalate without detrimental effects to the finished product and, in some instances, improvements are observed in the physical and chemical properties of the high polymer by the use of recovered alkylene glycol without purification. The amount of alkylene glycol recovered from the polymerization reaction for reuse can range from about 5 to about 100 percent of the alkylene glycol available but unused in the preparation of the monomeric material.

The process of the present invention is not restricted to the use of any particular type of processing apparatus. Generally however, the process requires a continuous source of monomeric bis(hydroxyalkyl) terephthlate, a polymerization vessel having a capacity for withdrawing considerable quantities of vaporous by-products from the polymerizing monomer to form a prepolymer and a vessel for effecting a final polymerization of the prepolymer to form a higher molecular weight or more viscous polymer. The monomeric bis(hydroxyalkyl)terephthalates produced can be converted into prepolymer having an intrinsic viscosity within the range from about 0.1 to about 0.4 by heating at a temperature above the boiling point of the corresponding glycol under conditions effecting removal of the glycol and to temperatures as high as 325° C., if desired, and reduced pressures preferably in the range from about 5 millimeters to about 200 millimeters of mercury. An apparatus which can be utilize to produce the prepolymer is described in the U.S. Patent 3,054,776 in the name T. C. Higgins. The prepolymer effluent from the prepolymerization apparatus is then continuously fed into a mixing of reactor maintained under similar conditions as described in the prepolymer process but with reduced pressures, i.e. from about 0.5 to about 10 millimeters of mercury, which effects more complete polymerization to produce polymer of the desired intrinsic viscosity to produce highly polymeric material suitable for forming fibers or film. The apparatus utilized to polymerize the high viscosity material may contain devices which serve to generate polymer surface area providing for the efficient evolution of the alkylene glycol by-product. At this point, the final polymer product can be extruded into a film or spun into a desirable filament.

A disadvantage of a continuous polymerization reaction is obvious, however, in that the production of the polymer product must be minutely regulated to the specific needs of the film casting or filament spinning operation. If interruptions occur in the extrusion operation, over production or under production of the polymer can seriously upset the equilibrium of the polymerization reaction. In waiting for the return of the reaction to equilibrium, valuable periods of time can be lost in the production phase. If reduced extrusion demand suddenly occurs, the reduced throughput in the final polymerizing apparatus, if maintained at constant level of reactants as is taught in the prior art, lends to an increase in resistence and reaction time, which can provide a number of undesirable results which include, among others, an appreciably higher molecular weight polymer than desired, producing a non-uniformity of the polymer product. Additionally, a reduction of the polymer demand can also introduce contaminants in the polymer by *increasing* the level of the reactant due to relay or lag of the control detecting devices, and the polymer can splash on the upper walls of the reactor and detrimentally degrade. These and other disadvanages can occur. On the other hand, if under production occurs, the polymer to the subsequent metering pumps may be starved and the flow of the liquid polymer to the casting or spinning operation will tend to come in surges instead of in the form of a uniform feed. Such an interruption in the flow of the polymer to the extrusion operation necessitates eventual shutdown of the extrusion operation. In addition, the reduced residence time will cause a lower molecular weight polymer than desired.

A significant feature of this invention is to provide a process wherein the deliberate over-production of the polymer which is sent to the extrusion operation can be advantageously utilized. Under these conditions, the excess molten polymethylene terephthalate polymer is removed prior to the extrusion operation. To the excess molten polymer is added sufficient amounts of the corresponding alkylene glycol utilized to prepare the monomeric bis(hydroxyalkyl) terephthalate under reaction conditions which will provide a precursor of the high molecular weight polymethylene terephthalate polymer; such as, monomeric bis(hydroxyalkyl) terephthalate, prepolymer or combinations thereof. The precursor thus produced is returned to the polymerization reaction at the point where the reaction material corresponds essentially to the precursor in composition, in intrinsic viscosity, among other properties. When the precursor is returned to the polymerization reaction, the supply of the monomeric bis(hydroxyalkyl) terephthalate is diminished or cut off in amounts to correspond to the amount of precursor added. Under these conditions, the level and flow rate and residence time of polymerizing material in the reactor is maintained substantially constant providing at all times a polymer of the desired uniform composition to the extrusion operation and irrespective of the change in demand. One feature which is indeed surprising relates to the absence of detrimental degradation, e.g. the production of contaminants, of the high molecular weight polymer in its reaction with the added alkylene glycol to produce the precursor which in turn can be further polymerized to obtain the desired high molecular weight polymer product.

The temperature conditions used to prepare the precursor from a high molecular weight polymer can range from about the boiling point of the alkylene glycol used to the degradation temperature of the precursor thus produced. These temperature preferably range from about 235° C. to about 325° C., if desired. It is essential, however, to avoid the use of excessive temperatures so as not to produce undesirable degradation contaminants. The length of time of heating will be sufficient to produce the desired homogeneous fluid mass.

The precursor production can be effected at atmospheric, reduced or elevated presures, but it is preferred to utilize atmospheric or elevated pressure, for example, from about 20 to about 50 pounds per square inch gauge, or higher can be used. Since slight pressures enable the heating to be effected at higher temperatures, the speed of reaction leading to the production of the desired precursor can be significantly increased. The alkylene glycol used to produce the precursor is the corresponding alkylene glycol used to prepare the monomeric bis(hydroxyalkyl) terephthalate, for example, if high molecular weight polyethylene terephthalate is produced, ethylene glycol would be utilized to produce the desired precursor. One of the advantages which can be utilized in the process of this invention is the use of ethylene glycol recovered from the polymerization reaction of the bis(hydroxyalkyl) terephthalate monomer. It has been discovered that the alkylene glycol thus obtained need not be highly purified, i.e. to remove ethers or other by-products which may have formed in the polymerization reaction but can be used directly in the preparation of the precursor without detrimental effects. The amount of alkylene glycol used to prepare the precursor can vary depending on the molecular weight or intrinsic viscosity of the high molecular weight polymer which is utilized and also depending on the type of precursor desired by this reaction. The amount of alkylene glycol recovered from the polymerization reaction for reuse can range from about 5 to about 100 percent of the alkylene glycol available but unused to prepare the precursor. As the amounts of alkylene glycol are increased on addition to the polymer product, the molecular weight or intrinsic viscosity will be significantly reduced. In the reaction, to return the polymer to the intermediate of the polymer or to the monomer of bis(hydroxyalkyl) terephthalate, it is desirable that up to about 2 mols of alkylene glycol be used to 1 mol of the polymer product.

The process described herein can be further illustrated by reference to the accompanying drawing wherein is illustrated diagrammatically a flow sheet of preferred embodiments of the invention. For the production of bis (2-hydroxyethyl) terephthalate from terephthalic acid and ethylene glycol, a direct esterification reactor 10 containing a terephthalic acid inlet line 11 and an ethylene glycol inlet line 12 is maintained at temperatures in the range from about 200° C. to about 275° C. The amounts of ethylene glycol and terephthalic acid added to the reactor can range from about 1.0/1.0 to about 3.0/1.0 molar ratios of glycol to terephthalic acid, respectively. The esterification reaction conditions are continually maintained, to produce the initial monomeric bis(2-hydroxyethyl) terephthalate products; such as, half esters, esters, dimers and the like. During the esterification reaction, the volatiles which form, such as water, are removed through exit line 13. Monomeric bis(2-hydroxyethyl) terephthalate product produced in reactor 10 is then passed through line 14 into the prepolymerizer 15 wherein the initial polymerization reaction occurs at temperatures in the range from about 250° C. to about 285° C. and at pressures in the range from about 5 to about 60 millimeters mercury.

During the prepolymerization reaction, the ethylene glycol removed can be recycled through lines 16 and 25, back to the source of the original ethylene glycol for further use without an additional purification step in the esterification reaction. The prepolymer formed having an intrinsic viscosity in the range from about 0.1 to about 0.4 is then passed through line 17 into the final polymerizer 18 which is maintained under similar conditions as the prepolymer reaction but generally at lower pressures in the range from about 0.5 to about 10 millimeters of mercury. As the prepolymer is passed through the final polymerizer, a more complete polymerization occurs, i.e. the intrinsic viscosity of the product increases from about 0.4 to about 1.1, or higher, progressively as it passes through the final polymerizer. The product of the final polymerizer is withdrawn when the desired intrinsic viscosity of the polymer is obtained or conditions can be adjusted to obtain the desired product out of the exit line 21 which can be passed on to an extrusion operation, such as spinning into fiber or filament production.

Assuming a sudden reduced demand of polymer rate to the extrusion apparatus, the excess amount of polymer produced can be withdrawn from line 21 through line 22. Line 22 is heated not only to maintain the excess polymer in a molten state but also to provide sufficient heat for the reaction of the added ethylene glycol to form the precursor described hereinafter. It is not desirable to maintain the excess polymer in its molten state over extended periods of time since contamination degradation can occur.

The excess molten polymer in this process can be treated in several ways for further use. The ethylene glycol which is produced in the final polymerizer can be added via lines 19 and 20 to the excess polymer in heated line 22 to produce the polymer precursor, i.e. prepolymer, monomer, or mixtures thereof. If sufficient ethylene glycol is recovered from the final polymerizer to produce the precursor equivalent in composition to the prepolymer in vessel 15 or line 17, the precursor can then be returned via line 22 through line 24 to vessel 15 and returned to the final polymerizer through line 17 for further polymerization. If the amount of ethylene glycol from the final polymerizer in line 20 is not sufficient, additional ethylene glycol can be supplied to line 20 or line 22.

A method of determining composition of the precursor in line 22 can be made by a measurement of intrinsic or melt viscosity of the precursor. It should be noted at this point, however, that if the precursor is added back to the final polymerizer, the amounts of prepolymer or monomeric material prepared prior to the final polymer should be diminished by adjusting the flow of materials fed via lines 11 and 22 and also 12, if desired, in amounts corresponding stoichiometrically to the amounts of the precursor added to the final polymerizer. Under these conditions, the desired process parameters in the final polymerizer will be maintained thereby assuring a uniform polymer product and avoiding production of undesirable contaminants. Additionally, if the precursor produced in line 22 is equivalent in composition to the monomeric material produced in the esterification reaction and supplied through line 14, the precursor produced in line 22 can be added through line 24 to the prepolymerizer, if desired, with the appropriate change of reactants via lines 11 and 22 mentioned above.

The highly preferred procedure is to transfer the excess molten polymer in line 22 to the esterification reactor 10 and adjusting the supply of terephthalic acid and glycol. Under these conditions, control of the operating process parameters, particularly flow rate, level and residence time of the reactants in all units of the process are maintained invariant. The amounts of ethylene glycol added to the high molecular polymer to produce the precursor can be made, if desired, equivalent on a molecular basis to the amount of ethylene glycol needed for reaction with the terephthalic acid fed via line 11 to produce the monomeric bis (2-hydroxyethyl) terephthalate product. Under these conditions, the ethylene glycol naturally required and fed to item 10 via line 12 could be discontinued. Alternatively, no glycol at all need be added to the molten excess polymer in line 22 but could be transferred back to the esterification reactor via lines 19 and 25. The excess high molecular weight polymer passing via line 22 would not be reacted with glycol in route but would then be transformed to the essentially monomeric bis(2-hydroxyethyl) terephthalate in the esterification reactor where it is reacted in situ with the glycol via line 12, and the product would be used for further repolymerization, as described herein. As can be readily determined, there are many additional variations for the return of the polymer back to the polymerization process which are inherently incorporated in the description of the accompanying drawings.

Although the description of the drawing specifically includes the use of terephthalic acid as one of the starting materials, dialkyl terephthalates such as dimethyl terephthalate can be utilized in the preparation of monomeric bis(hydroxyalkyl) terephthalate products. In the preparation of the polymethylene terephthalate polymers by the process of this invention, minor amounts of known modifying materials, if desired, may be added, i.e. various glycols, various dicarboxylic acids, dyemodifiers, catalysts, inhibitors, and the like. These modifiers may be added as one of the initial reactants during the esterification and polymerization process or the modifying material may also be polymerized separate and melt blended with the polymethylene terephthalate material desired. In addition, and without detrimental effects to the process of this invention, various additives, such as delustrants and the like, can be added to the polymer product to obtain desired effects in the polymer product as well as catalysts to increase the speed of reaction in the process of this invention. The preferred polymethylene terephthalate polymer to be used in the process of this invention is polyethylene terephthalate, as described in U.S. Patent 2,465,319 to Whinfield and Dickson.

It is understood that the foregoing description is merely illustrative of preferred embodiments of the invention of which many variations may be made by those skilled in the art within the scope of the following claims without departing from the spirit thereof.

I claim:

1. In a continuous polymerization process for the production of polyethylene terephthalate polymer consisting essentially of the polymerization of bis(2-hydroxyethyl) terephthalate and employing glycol removal temperatures of up to about 325° C. together with reduced pressures; the method of maintaining constant equilibrium conditions in the polymerization stages in the production of polyethylene terephthalate polymer to be used in an extrusion operation by removing the excess polyethylene terephthalate polymer prior to said extrusion operation; adding sufficient amounts of ethylene glycol to said excess polyethylene terephthalate polymer to produce the precursor of said polymer said precursor having a lower intrinsic viscosity than the finished polymer and returning said precursor to the polymerization reaction at the point wherein the intrinsic viscosity of said precursor corresponds to the intrinsic viscosity of the materials to be polymerized while maintaining constant invariant physical processing parameters of the polymerization mass.

2. The process of claim 1 wherein the ethylene glycol recovered from the polymerization reaction is utilized to prepare the precursor in amounts from about 5 to about 100 percent of the ethylene glycol available but unused to prepare said precursor.

3. In a continuous polymerization process for the production of polymethylene terephthalate polymer consisting essentially of the continuous production of bis(hydroxyethyl) terephthalate product by the esterification reaction of terephthalate compounds selected from the group consisting of terephthalic acid and dialkyl esters of terephthalic acid wherein the alkyl radical contains from 1 to 10 carbon atoms with ethylene glycol and the subsequent continuous polymerization of said bis(hydroxyethyl) terephthalate at glycol removal temperatures of up to about 325° C. together with reduced pressures; the method of maintaining constant equilibrium conditions in the polymerization stages in the production of polyethylene terephthalate polymer to be used in an extrusion operation by removing said excess polyethylene terephthalate polymer prior to said extrusion operations; returning the excess polymer to the initial esterification reactor, diminishing the molar amount of terephthalate compound used to prepare bis(hydroxyethyl) terephthalate, equivalent to the amount of terephthalate compound present in said excess polymer, adding sufficient ethylene glycol used to prepare the initial bis(hydroxyethyl) terephthalate to said excess polymer to reproduce the bis(hydroxyethyl) terephthalate product and polymerizing the resultant product in said continuous polymerization reaction.

4. The process of claim 3 wherein the ethylene glycol recovered from the polymerization reaction is utilized to prepare bis(hydroxyethyl) terephthalate product in amounts from about 5 to about 100 percent of the ethylene glycol available but unused to prepare said bis(hydroxyethyl) terephthalate product.

5. The process of claim 4 wherein the terephthalate compound used is terephthalic acid.

6. The process of claim 4 wherein the terephthalate compound is dimethyl terephthalate.

References Cited

High Polymers, vol. X, Polymer Processes, edited by C. A. Schildkneckt, 1956, p. 63.

WILLIAM H. SHORT, Primary Examiner

M. GOLDSTEIN, Assistant Examiner

U.S. Cl. X.R.

260—2.3